(12) United States Patent
Gordon et al.

(10) Patent No.: US 11,030,805 B2
(45) Date of Patent: Jun. 8, 2021

(54) DISPLAYING DATA LINEAGE USING THREE DIMENSIONAL VIRTUAL REALITY MODEL

(71) Applicant: International Business Machines Corporation, Armonk, NY (US)

(72) Inventors: Itai Gordon, Modiin (IL); Ilan D. Prager, Beit Shemesh (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/560,892

(22) Filed: Sep. 4, 2019

(65) Prior Publication Data

US 2019/0392638 A1  Dec. 26, 2019

Related U.S. Application Data

(63) Continuation of application No. 15/440,602, filed on Feb. 23, 2017, now Pat. No. 10,431,002.

(51) Int. Cl.
*G06T 19/00* (2011.01)
*G06F 16/26* (2019.01)
*G06F 16/28* (2019.01)
*G06F 16/215* (2019.01)

(52) U.S. Cl.
CPC .......... *G06T 19/003* (2013.01); *G06F 16/215* (2019.01); *G06F 16/26* (2019.01); *G06F 16/283* (2019.01)

(58) Field of Classification Search
CPC ................................................ G06F 16/28–29
See application file for complete search history.

(56) References Cited

U.S. PATENT DOCUMENTS

| | | | |
|---|---|---|---|
| 5,778,370 A | 7/1998 | Emerson | |
| 6,348,927 B1 | 2/2002 | Lipkin | |
| 6,760,731 B2 | 7/2004 | Huff | |
| 7,117,219 B1 * | 10/2006 | Powers | G06Q 40/00 707/603 |

(Continued)

OTHER PUBLICATIONS

Massari et al., "Virgilio: a VR-based system for database visualization", 1996, AVI '96: Proceedings of the workshop on Advanced visual interfaces, May 1996, pp. 263-265, available at https://doi.org/10.1145/948449.948492 (Year: 1996).*

(Continued)

*Primary Examiner* — Phong X Nguyen
(74) *Attorney, Agent, or Firm* — Cuenot, Forsythe & Kim, LLC

(57) ABSTRACT

Data lineage including a plurality of levels can be received. A configuration also can be received. A three dimensional (3D) virtual reality (VR) model can be built, the 3D VR model including a plurality of floors based on data lineage content corresponding to the plurality of levels and the configuration. The 3D VR model can depict, on at least a first of the plurality of floors, a plurality of rooms of a virtual building representing data elements and hallways of the building representing data flows between data elements. A view of the 3D VR model can be displayed on a display device, wherein the 3D VR model is configured for a user to navigate the plurality of the rooms and hallways of the virtual building to determine lineage of data.

15 Claims, 6 Drawing Sheets

(56) References Cited

U.S. PATENT DOCUMENTS

| | | |
|---|---|---|
| 7,269,786 B1 | 9/2007 | Malloy |
| 7,298,378 B1 | 11/2007 | Hagenbuch |
| 7,865,461 B1 | 1/2011 | Best |
| 8,688,606 B2 | 4/2014 | Negi |
| 8,886,592 B2 | 11/2014 | Huff |
| 8,994,725 B1 | 3/2015 | Furukawa |
| 9,383,905 B1 | 7/2016 | Kumar |
| 9,384,231 B2 | 7/2016 | Benjamin |
| 9,721,038 B1 | 8/2017 | Xiang |
| 10,175,974 B2* | 1/2019 | Bach ............... G06F 8/34 |
| 10,268,345 B2* | 4/2019 | Aggour ............ G06Q 10/10 |
| 10,431,002 B2 | 10/2019 | Gordon et al. |
| 10,521,442 B1* | 12/2019 | Gatchell ........... G06Q 40/06 |
| 2001/0054034 A1 | 12/2001 | Arning |
| 2007/0061353 A1* | 3/2007 | Bobbin ............ G06F 3/04842 |
| 2009/0244059 A1 | 10/2009 | Kulkarni |
| 2009/0307189 A1 | 12/2009 | Bobbitt |
| 2010/0131916 A1 | 5/2010 | Prigge |
| 2010/0145998 A1 | 6/2010 | Poce |
| 2012/0001917 A1 | 1/2012 | Doganata |
| 2012/0095793 A1 | 4/2012 | Averbuch |
| 2012/0143681 A1 | 6/2012 | Alcazar |
| 2012/0173747 A1* | 7/2012 | Roesch ............ G06Q 10/063 709/231 |
| 2012/0179990 A1* | 7/2012 | Curbera ........... G06Q 10/10 715/771 |
| 2012/0197871 A1 | 8/2012 | Mandel |
| 2012/0310875 A1* | 12/2012 | Prahlad ............ G06F 16/2465 707/602 |
| 2013/0041937 A1* | 2/2013 | Zhu ................. H04L 67/2847 709/203 |
| 2013/0135303 A1 | 5/2013 | Densham |
| 2013/0238290 A1 | 9/2013 | Angevine |
| 2013/0332423 A1* | 12/2013 | Puri ................. G06F 16/2358 707/687 |
| 2014/0258340 A1 | 9/2014 | Crowthers |
| 2015/0012478 A1* | 1/2015 | Mohammad ...... G06F 16/254 707/602 |
| 2015/0091906 A1* | 4/2015 | Dishno ............ G06F 16/954 345/427 |
| 2015/0347193 A1 | 12/2015 | Wolfson |
| 2015/0347542 A1* | 12/2015 | Sullivan .......... G06F 16/254 707/602 |
| 2016/0301708 A1* | 10/2016 | Grondin .......... H04L 63/1408 |
| 2017/0052669 A1 | 2/2017 | Li |
| 2017/0061702 A1 | 3/2017 | Christen |
| 2017/0154087 A1* | 6/2017 | McClure .......... G06F 16/245 |
| 2017/0235621 A1* | 8/2017 | Haber .............. G06F 16/2365 714/37 |
| 2017/0270022 A1* | 9/2017 | Moresmau ....... G06F 11/323 |
| 2018/0157651 A1* | 6/2018 | Smith .............. G06Q 30/0201 |
| 2018/0173774 A1* | 6/2018 | Mcpherson ...... G06F 16/254 |
| 2018/0181630 A1* | 6/2018 | He .................. G06F 16/9024 |

OTHER PUBLICATIONS

"Assets That Are Included in Lineage Reports," [online] IBM Knowledge Center, retrieved Dec. 14, 2016, retrieved from the Internet: <http://www.ibm.com/support/knowledgecenter/SSZJPZ_11.5.0/com.ibm.swg.im.iis.mdwb.doc/topics/r_assetTypes-SourceReports.html>, 2 pg.

Mitchell, W. et al., "Finding the Needle In The Haystack—An Innovative Means of Visualizing Control Performance Problems," [online] Apr. 2004, retrieved Dec. 16, 2016, retrieved from the Internet: <https://www.cs.umd.edu/hcil/treemap-history/ERTCMPCVisualization12Apr04.pdf>, 17 pg.

Moran, A. et al., "Improving Big Data Visual Analytics With Interactive Virtual Reality," In 2015 IEEE High Performance Extreme Computing Conference (HPEC), Sep. 15, 2015, pp. 1-6, IEEE.

IBM: List of IBM Patents or Patent Applications Treated as Related, 2 pg.

Gordon, I. et al., "Displaying Data Lineage Using Three Dimensional Virtual Reality Model", U.S. Appl. No. 15/440,602, filed Feb. 23, 2017, 32 pages.

* cited by examiner

DISPLAYING DATA LINEAGE USING THREE DIMENSIONAL VIRTUAL REALITY MODEL

BACKGROUND

The present techniques relate to displaying a data lineage. More specifically, the techniques relate to displaying a data lineage using a three dimensional virtual reality model.

SUMMARY

A method includes receiving data lineage including a plurality of levels and receiving a configuration. The method also can include building, by a processor, a three dimensional (3D) virtual reality (VR) model including a plurality of floors based on data lineage content corresponding to the plurality of levels and the configuration, the 3D VR model depicting, on at least a first of the plurality of floors, a plurality of rooms of a virtual building representing data elements and hallways of the building representing data flows between data elements. The method also can include displaying, on a display device, a view of the 3D VR model, wherein the 3D VR model is configured for a user to navigate the plurality of the rooms and hallways of the virtual building to determine lineage of data.

A system includes a processor programmed to initiate executable operations. The executable operations include receiving data lineage including a plurality of levels and receiving a configuration. The executable operations also can include building a three dimensional (3D) virtual reality (VR) model including a plurality of floors based on data lineage content corresponding to the plurality of levels and the configuration, the 3D VR model depicting, on at least a first of the plurality of floors, a plurality of rooms of a virtual building representing data elements and hallways of the building representing data flows between data elements. The executable operations also can include displaying, on a display device, a view of the 3D VR model, wherein the 3D VR model is configured for a user to navigate the plurality of the rooms and hallways of the virtual building to determine lineage of data.

A computer program product includes a computer readable storage medium having program code stored thereon, wherein the computer readable storage medium is not a transitory signal per se, the program code executable by a data processing system to initiate operations. The operations include receiving data lineage including a plurality of levels and receiving a configuration. The operations also can include building a three dimensional (3D) virtual reality (VR) model including a plurality of floors based on data lineage content corresponding to the plurality of levels and the configuration, the 3D VR model depicting, on at least a first of the plurality of floors, a plurality of rooms of a virtual building representing data elements and hallways of the building representing data flows between data elements. The operations also can include displaying, on a display device, a view of the 3D VR model, wherein the 3D VR model is configured for a user to navigate the plurality of the rooms and hallways of the virtual building to determine lineage of data.

DETAILED DESCRIPTION

Figure 1:
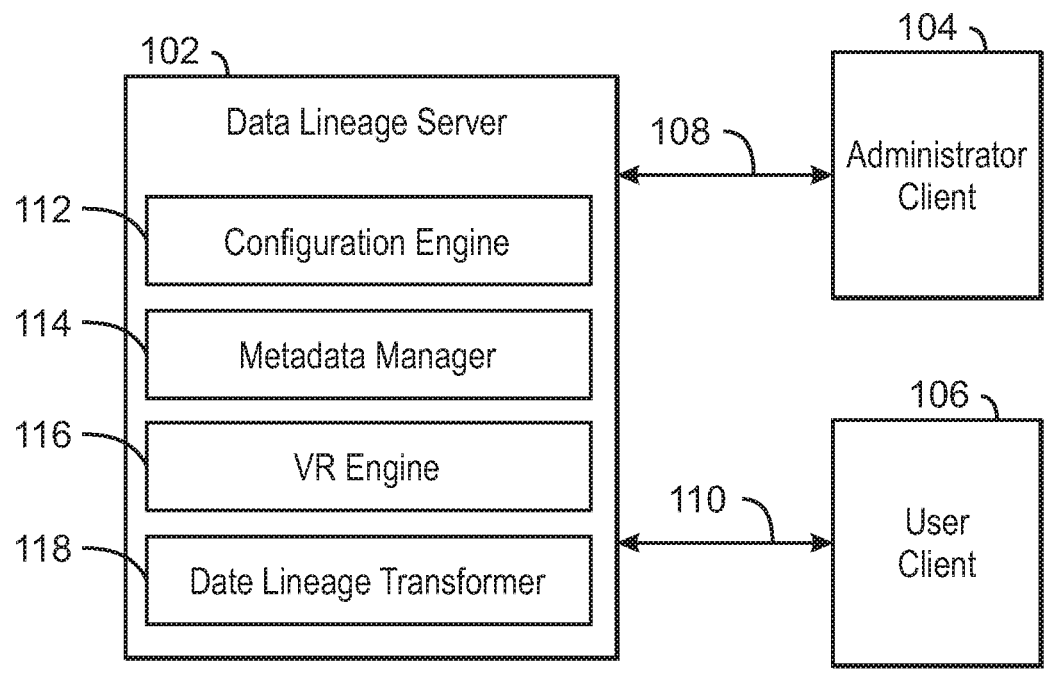
FIG. 1 is a block diagram of an example system that can display data lineage using a three dimensional virtual reality model.

Extract, Transform, Load (ETL) systems can move and change data between different systems in enterprise and data lineage systems and can display how the data was moved and transformed from one source to another. When there are issues in the data in one source, data lineage tools can be used in order to find the cause for a particular issue.

However, since there may be multiple hierarchical data assets and a corresponding history of data movement in each level, diagnosing issues in 2d views of data lineage may be both difficult and time consuming. As used herein, data assets may include databases, schemas, tables, fields, etc. For example when a user encounters a wrong value in a column in a report and wants to track the cause of the issue, the user may apply data lineage in order to understand where the data came from and identify the root cause for a value being wrong. Currently, data lineage analysis may involve the use of two dimensional lineage graphs for each asset level in order to investigate the cause of wrong data in a particular column, which can be a difficult, time consuming, and tedious process.

According to embodiments of the present techniques a processor may receive data lineage including a plurality of levels and a configuration. For example, the levels may correspond to different data asset levels such as databases, schemas, tables, fields, etc., of a data asset. In some examples, the configuration may include default settings for a visual representation of the levels. The processor may build a three dimensional (3D) virtual reality (VR) model including a first floor based on data lineage content corresponding to a first level of the plurality of levels and the configuration. For example, the first level may be a set of databases. The processor may also display a view of the 3D VR model. The processor may further update the view of the VR model in response to detecting a request for existing data from the first level. The processor may then fetch additional data from the first level in response to detecting a request for additional data from the first level. The processor may then build additional floors including a second floor in the VR model based on a second level of the plurality of levels in response to detecting a request for a change in context. In some examples, the processor may prefetch data from the data lineage content based on a predicted request. For example, the processor can predict a request based on a history of past requests. The processor may then fetch data that may not be shown, but may probably be shown soon, in order to improve user experience. Thus, the present techniques may enable users to view multiple aspects of data lineage at the same time and within context. For example, users may be able to see a hierarchy and a history, among other aspects of the data lineage simultaneously. The present techniques may combine different levels of data hierarchy and enable users to navigate easily and quickly between different views of the data lineage. For example, the view present to a user may be updated as the context is changed by walking through the 3D VR model. Moreover, the data lineage content used to present the view may be retrieved as the view is being updated. Thus, the techniques described herein may be more efficient than a system using a 3D VR model including all data lineage content. Moreover, settings of the configuration can be changed based on a particular scenario. For example, the scenario may be a temporal issue in the data lineage. Thus, the techniques may enable a customized way of viewing a particular data lineage based on a suspected temporal issue. In addition, the present techniques may also use a default configuration to provide operability without any prerequisite configuration. Thus, the overhead and resources that might otherwise be used to preconfigure such a system may be conserved. In some examples, the techniques can thus be used to diagnose temporal issues in data lineage using a 3D VR model. For example, the 3D VR model may enable contextualized data lineage history inspection and a deeper inspection into data asset hierarchy with actual data. For example, the actual data may be values of different elements of the data assets. The techniques described herein thus enable a user to see a data lineage and its history and hierarchy in a quick and clear manner and adapt a view of the issue according to a suspected root cause of a temporal issue. In some examples, the root cause of a data lineage issue can be identified using the techniques described herein and modified accordingly to resolve the temporal issue.

In some scenarios, the techniques described herein may be implemented in a cloud computing environment. As discussed in more detail below in reference to at least FIGS. 3, 4, and 5, a computing device configured to display data lineage using a three dimensional virtual reality model may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

FIG. 1 is a block diagram of an example system that can display data lineage using a three dimensional virtual reality model. The system is generally referred to using the reference number 100 and can be implemented at least in part using the computing device 300 of FIG. 3 below.

The example system 100 includes a data lineage server 102, an administrator client 104, and a user client 106. The data lineage server 102 is coupled to the administrator client 104 and the user client 106 via connections 108, 110, respectively. In some examples, the user client 106 may include a virtual reality (VR) display, such as VR glasses or VR goggles, or the like. The data lineage server 102 further includes a configuration engine 112, a metadata manager 114, a virtual reality (VR) engine 116, and a data lineage transformer 118.

In the example system 100, an administrator client 104 may receive one or more settings from an administrator and send the settings to the data lineage server 102. For example, the settings may configure how each data asset, type of data, and each period in the history of the data lineage is to appear in the three dimensional virtual reality model. The settings may also include how navigation is to be performed between different views in the three dimensional virtual reality model. For example, the settings may specify actions that may cause movement between different views. In some examples, the settings may per user settings, per lineage type settings, etc. For example, per user settings may include styles of presenting the data and a set of actions for transforming views for a particular user. In some examples, per lineage type settings may include styles of presenting the data and a set of actions for transforming views for a particular data lineage type. For example, the data lineage type may be a one-to-one lineage type or a one-to-many lineage type.

As shown in FIG. 1, the data lineage server 102 may receive settings from the administrator client 104. The configuration engine 112 may then be used to configure how each asset and data type appears in the three dimensional virtual reality model based on the received settings. In some examples, the configuration engine 112 may be used to customize a view for each user based on an area and an intensity of data and its hierarchy and history. For example, a higher Intensity of data with many assets in each level may result in a model that may look different than a lower intensity of data with few assets in each level. An area of data, as used herein, refers to a particular data asset type. For example, a database area may have one view and files area may have a different view. In some examples, the configuration engine 112 may also have default settings to use in the case that the data lineage server 102 does not receive any settings from an administrator client 102. For example, the default settings may include a default configuration of how to map data and how navigation in the 3D VR model is to be performed. The configuration engine 112 may also be used to configure how different views may be navigated and which actions cause movement between views based on the received setting or the default settings. For example, the configuration engine 112 can be used to configure how a user moves in the 3D VR model in order to adapt the 3D VR model to a specific user with a specific scenario. For example, the scenario may be a temporal issue in the data lineage. The configuration may be sent to the data lineage transformer 118.

The metadata manager 114 can receive a data lineage and provide data lineage content. In some examples, the data lineage may include a history of the data assets. For example, the data lineage content may include information about data flows between data assets. In some examples, the data lineage may be provided by the user client 106. In some examples, the metadata manager 114 can provide the data lineage transformer 118 with data lineage content corresponding to one or more levels of data lineage in response to receiving a request from the data lineage transformer 118 for the data lineage content.

The VR engine 116 can programmatically and dynamically build a three dimensional virtual reality model based on the data lineage content and the configuration. For example, the VR engine 116 can dynamically build the 3D VR model while part of the 3D VR model is being used. In some examples, the VR engine 116 can include any suitable 3D modeling software that supports dynamic building of 3D VR models.

The data lineage transformer 118 can receive the configuration from the configuration engine 112 and monitor actions performed by the user client 106 in the 3D VR model. In some examples, the data lineage transformer 118 can detect an action from the user client 106. For example, the action may be a user request to see data lineage of an asset or between specific assets. The data lineage transformer 118 can pull the current information form the metadata manager 114 and can present the information to the user client 106 as virtual reality model according to the configuration received from the configuration engine 112. Thus, the data lineage transformer 118 may operate as a bridge between the user client 106 and the VR engine 116 that transforms actions taken in the 3D VR model and transforms the actions into requests for additional data from the data lineage. For example, the actions may be user movement, rotation, or other change in point of view. The data lineage transformer 118 may then present the additional data to the VR engine 116 to be presented as 3D VR elements in the 3D VR model at the user client 110.

In some examples, the user client 106 can be used to navigate between the assets and see how the data flows between the assets. For example, the user client 106 can be used to request a change of a current view of a current flow and have a view of a history of flows between the assets. The data lineage transformer 118 can pull the history of the flow between the assets from a metadata repository and present the history via the user client 106 in a manner that may enable a user to see and compare the assets. In some examples, the data lineage transformer 118 can pull data from the metadata repository iteratively. For example, data may be pulled from the metadata repository as it is to be used.

In some examples, the user client 106 may thus be used to dive into a hierarchy of assets that the data was flowing such that relevant data is pulled from the metadata repository and interpreted by the data lineage transformer 118 into the virtual reality model. For example, a first view may present data flows between databases. The user client 106 may then be used to then dive deeper into schema flows and table views, etc. In some examples, a view may present different levels at the same time. In some examples, for each level of data assets and history range, the user client 106 can be used to inspect the actual data that is flowing between the assets as grouped by type, and then the view can be updated to present each actual transaction separately. The user client 106 may thus be used to navigate a path towards a cause of some data lineage issue. For example, the issue may be a temporal issue in the data lineage. In some examples, the user client 106 can be used to mark a way in the virtual way in order to report that path for the cause of the issue. The user client 106 can then be used to save a state in the virtual reality model so that a user may be able to come back to the saved state later. The user client 106 may thus be used to save set of virtual actions performed as a set in order to save time in future investigations. For example, the set of virtual actions and saved states may be sent to the configuration engine 112 and saved for later use.

In one example, the 3D VR model generated by the VR engine 116 may be a representation of a user in a transparent building with many floors corresponding to levels in the data lineage. In some examples, the floors may represent a hierarchy of assets. For example, the first floor may represent a database's fields, the second floor may represent a database's tables, and a third floor may represent a database's schemas. Each floor may also have many rooms and hallways. In some examples, each hallway may represent a flow of data between elements at a specific level. For example, the flow of data may be from a data column, to a data stage job field, to a report column. In some examples, while the user client 106 is used to navigate this hallway, the view may present these elements such as items such as doors to rooms that may contain data for each corresponding element. In some examples, the user client 106 can be used to open the door and see more details about the corresponding element. In some examples, the user client 106 can be used to turn left between the doors and view an older history of the data lineage or turn right to return to a newer data lineage history. In some examples, the user client 106 can be used to jump to the next floor in order to look at data lineage in other level of objects. For example, the objects can include a table, report, job, etc. The user client 106 may then be used to walk in a hallway representing a second level of data lineage with the same convention of looking on history by navigating to left and right.

In some examples, the user client 116 can be used to walk in a path with different levels in the same path. For example, user could virtually walk between levels and see objects in different levels one after another. In some examples, the user may see database field first and then database schema, and then database table, etc. In some examples, while on the same floor, a user may see objects of the same type. In some examples, a user can wear VR glasses that can allow the user client 116 to tune to an asset level for each item in the data lineage. When the user moves back and forth the data remains. In some examples, the user client 106 can be used to look up and view items in upper levels of an asset. For example, if the asset is a column, then the user client 116 can be used to view the table, schema, database, etc. Likewise, the user client 106 can be used to look down to view lower levels. For example, if the asset is a database, then the lower levels may include a schema or table column. In some examples, the user client 106 may also be used to view a history of an element as a hallway, where every door is a history asset, instead of jumping one by one between history assets.

Thus, for example, a user may encounter a wrong value in a column in a data report and may thus want to track the cause of the issue in order to fix the underlying cause. The techniques described herein may thus be used in order to understand where the data is coming from and what the root cause is for the wrong value in the data report. In some examples, the user can use the techniques described herein to browse through views of a generated VR model and see that the current data is coming from some database, which may appear issue free. In some examples, the user may then look into in the history of flow via the user client 106 and see that the data was previously coming from the same database. In some examples, the user can then browse deeper into the actual field in the database that the data was taken from and may see that until recently that field was updated from some Job, but the Job changed to another Job. In addition, when the user looks at the actual value, the user may immediately visually see a current value is in Euros (EUR), while the value was previously US dollars (USD). The user can thus conclude that the change to the job caused the issue and fix that job. In some examples, the user may then track the fixed job to see if the change fixes the issue.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional clients, servers, connections, engines, etc.).

Figure 2:
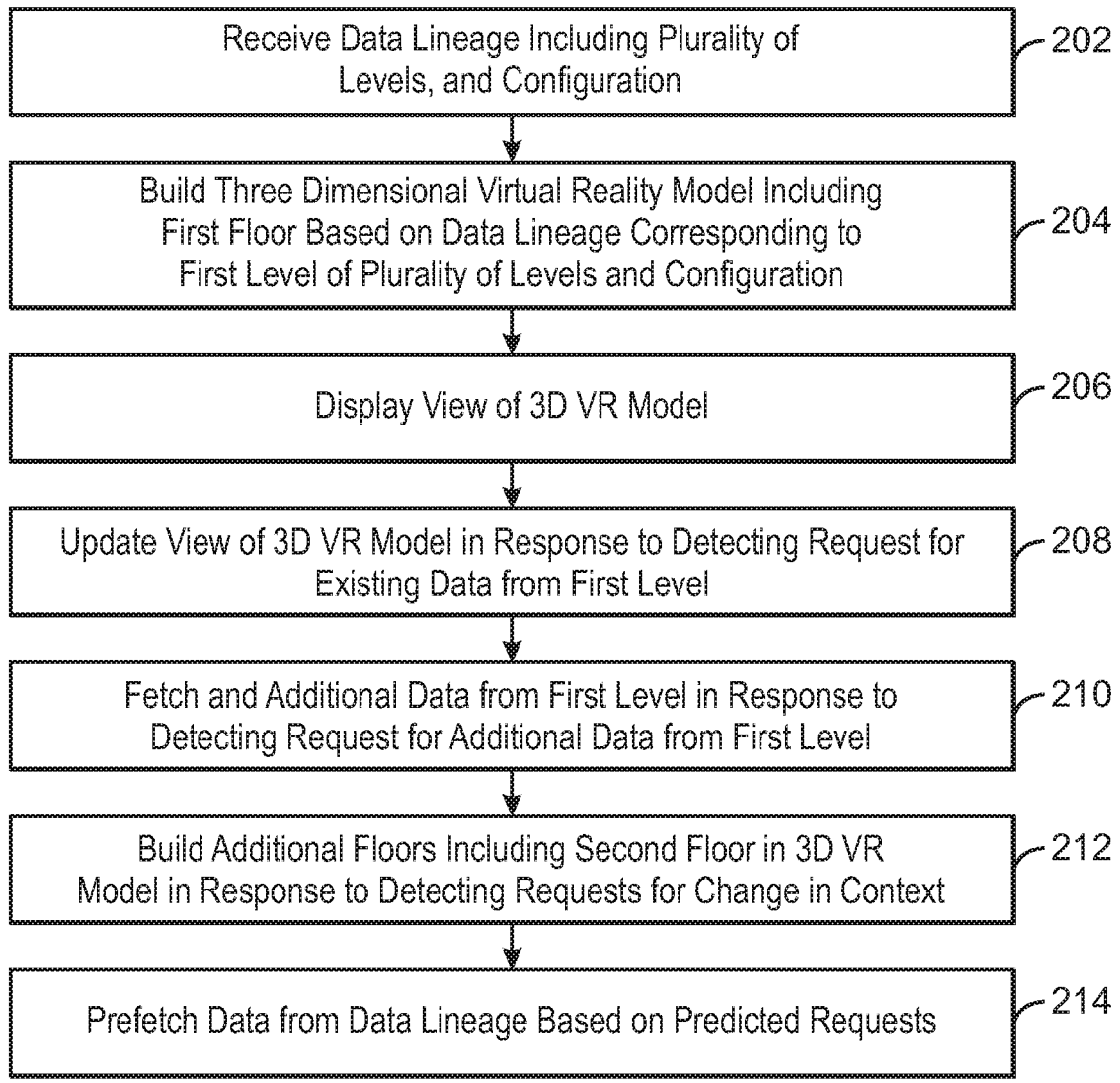
FIG. 2 is a process flow diagram of an example method that can display data lineage using a three dimensional virtual reality model.

FIG. 2 is a process flow diagram of an example method that can display data lineage using a three dimensional virtual reality model. The method 200 can be implemented with any suitable computing device, such as the computing device 300 of FIG. 3. For example, the method can be implemented via the processor 302 of computing device 300.

At block 202, the processor receives data lineage including a plurality of levels, and a configuration. In some examples, the data lineage may include a history of data assets. For example, the plurality of levels may include one or more data flows between data assets. In some examples, the configuration may include default or customized settings for displaying the data lineage. For example, the settings may be per user settings or per data lineage settings.

At block 204, the processor builds a three dimensional (3D) virtual reality (VR) model including a first floor based on data lineage corresponding to a first level of the plurality of levels and the configuration. For example, the processor can execute the data lineage to generate data lineage content used to build the 3D VR model. In some examples, the data lineage content may include specific values of one or more data assets. For example, the first floor may represent the data lineage in the database field level, a second floor may represent the database table level, a third floor may represent the lineage at the database schema level, and a fourth floor represents the lineage at the database level. In some examples, any suitable virtual reality software development kit may be used to build the 3D VR model.

At block 206, the processor displays a view of the 3D VR model. For example, the view may present data lineage content according to the configuration. In some examples, the view may present a first floor of a virtual building with a number of hallways representing data flow.

At block 208, the processor updates the view of the 3D VR model in response to detecting a request for existing data from the first level. For example, the existing data may be a value of a data asset that has been already calculated but not yet presented. In some examples, the data asset may be located behind a door in a hallway. In some examples, upon opening the door from the hallway or moving into the room, the values of data assets within the room can be presented.

At block 210, the processor fetches additional data from the first level in response to detecting a request for additional data from the first level. For example, the additional data may be historical data that is requested by looking to the left. In some examples, the processor can execute data lineage to generate data lineage content corresponding to the historical data and present the data in an updated view.

At block 212, the processor builds additional floors including a second floor in the 3D VR model in response to detecting a request for a change in context. For example, the processor may build the second floor based on a second level of the plurality of levels. For example, the second floor may represent one or more data flows between data assets at a different level of the data lineage. For example, the level may be different databases, schemas, tables, fields, etc., of a data asset.

At block 214, the processor prefetches data from the data lineage based on a predicted request. For example, the processor may save and store previous data request and predict future requests based on the stored data requests. Thus, the data may be readily available to be used when a request for the prefetched data is received. The processor may then request data corresponding to assets that are not presented based on previous information or any suitable heuristics in order to render better the VR model and provide a better user experience.

The process flow diagram of FIG. 2 is not intended to indicate that the operations of the method 200 are to be executed in any particular order, or that all of the operations of the method 200 are to be included in every case. Additionally, the method 200 can include any suitable number of additional operations. For example, the method may include detecting a root cause of a temporal issue and modifying a value of a data element corresponding to the detected root cause. The processor may then track the modified data element to determine whether the temporal issue is resolved.

Figure 3:
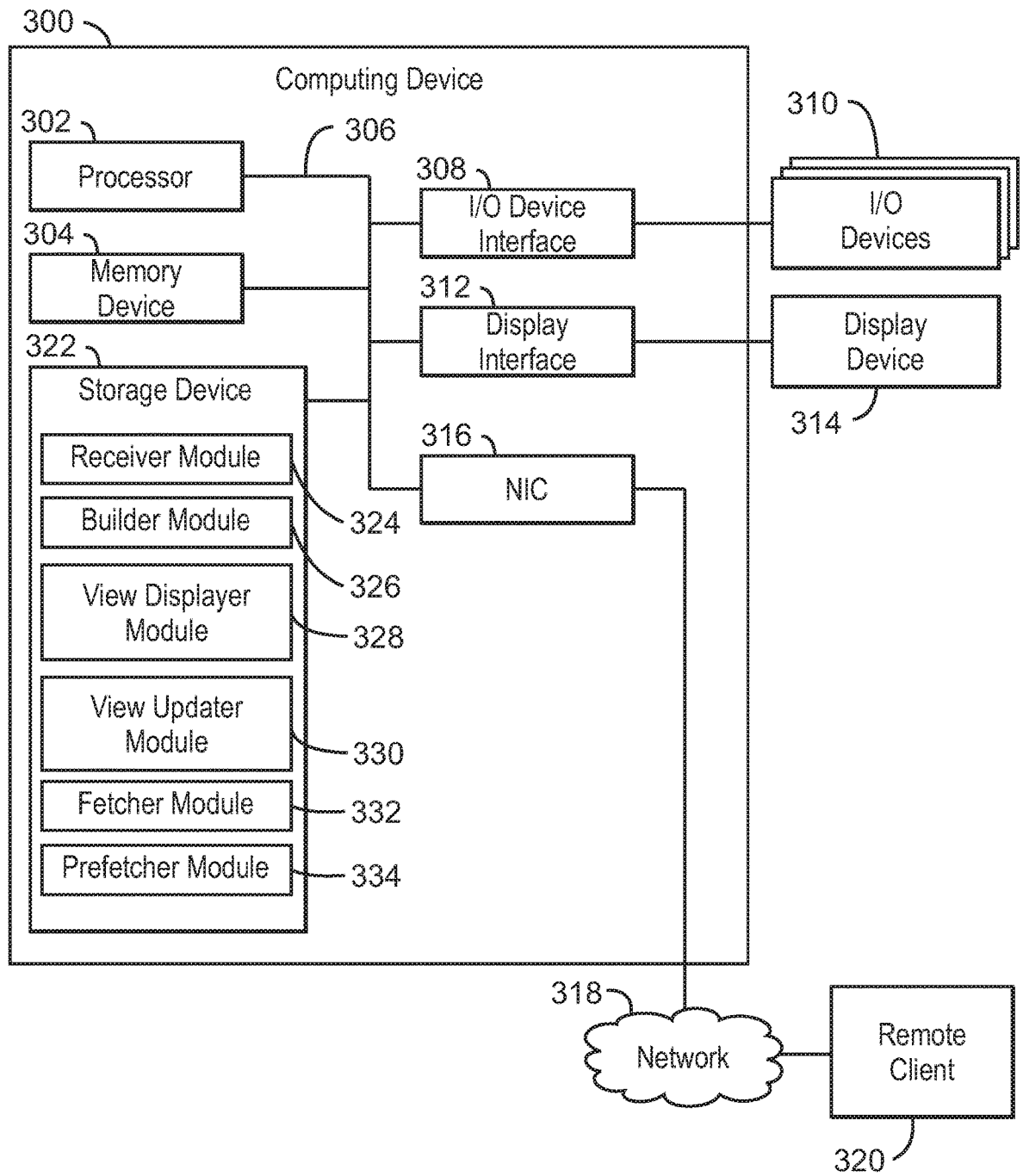
FIG. 3 is a block diagram of an example computing device that can display data lineage using a three dimensional virtual reality model.

With reference now to FIG. 3, an example computing device can display data lineage using a three dimensional virtual reality model. The computing device 300 may be for example, a server, a network device, desktop computer, laptop computer, tablet computer, or smartphone. In some examples, computing device 300 may be a cloud computing node. Computing device 300 may be described in the general context of computer system executable instructions, such as program modules, being executed by a computer system. Generally, program modules may include routines, programs, objects, components, logic, data structures, and so on that perform particular tasks or implement particular abstract data types. Computing device 300 may be practiced in distributed cloud computing environments where tasks are performed by remote processing devices that are linked through a communications network. In a distributed cloud computing environment, program modules may be located in both local and remote computer system storage media including memory storage devices.

The computing device 300 may include a processor 302 that is to execute stored instructions, a memory device 304 to provide temporary memory space for operations of said instructions during operation. The processor can be a single-core processor, multi-core processor, computing cluster, or any number of other configurations. The memory 304 can include random access memory (RAM), read only memory, flash memory, or any other suitable memory systems.

The processor 302 may be connected through a system interconnect 306 (e.g., PCI®, PCI-Express®, etc.) to an input/output (I/O) device interface 308 adapted to connect the computing device 300 to one or more I/O devices 310. The I/O devices 310 may include, for example, a keyboard and a pointing device, wherein the pointing device may include a touchpad or a touchscreen, among others. The I/O devices 310 may be built-in components of the computing device 300, or may be devices that are externally connected to the computing device 300.

The processor 302 may also be linked through the system interconnect 306 to a display interface 312 adapted to connect the computing device 300 to a display device 314. The display device 314 may include a display screen that is a built-in component of the computing device 300. The display device 314 may also include a computer monitor, television, or projector, among others, that is externally connected to the computing device 300. In addition, a network interface controller (NIC) 316 may be adapted to connect the computing device 300 through the system interconnect 306 to the network 318. In some embodiments, the NIC 316 can transmit data using any suitable interface or protocol, such as the internet small computer system interface, among others. The network 318 may be a cellular network, a radio network, a wide area network (WAN), a local area network (LAN), or the Internet, among others. An external computing device 320 may connect to the computing device 300 through the network 318. In some examples, external computing device 320 may be a remote client 320. In some examples, external computing device 320 may be a cloud computing node.

The processor 302 may also be linked through the system interconnect 306 to a storage device 322 that can include a hard drive, an optical drive, a USB flash drive, an array of drives, or any combinations thereof. In some examples, the storage device may include a receiver module 324, a builder module 326, a view displayer module 328, a view updater module 330, a fetcher module 332, and a prefetcher module 334. The receiver module 324 can receive data lineage for a plurality of levels and a configuration. In some examples, the receiver module 324 can generate data lineage content based on the data lineage. The builder module 326 can then build a three dimensional (3D) virtual reality (VR) model including a first floor based on data lineage content corresponding to a first level of the plurality of levels and the configuration. The view displayer module 328 can display a view of the 3D VR model. The view updater module 330 can update the view of the VR model in response to detecting a request for existing data from the first level. The fetcher module 332 can fetch additional data from the first level in response to detecting a request for additional data from the first level. In some examples, the builder module 326 can also build a second floor in the VR model based on a second level of the plurality of levels in response to detecting a request for a change in context. The prefetcher module 334 can prefetch data from the data lineage content based on a predicted request. In some examples, the prefetcher module 334 can predict a request for data based on one or more previous requests. The prefetcher module 334 can then request data corresponding to assets that are not yet presented based on previous information or any suitable heuristics in order to render better the VR model and to provide a better user experience.

It is to be understood that the block diagram of FIG. 3 is not intended to indicate that the computing device 300 is to include all of the components shown in FIG. 3. Rather, the computing device 300 can include fewer or additional components not illustrated in FIG. 3 (e.g., additional memory components, embedded controllers, modules, additional network interfaces, etc.). Furthermore, any of the functionalities of the receiver module 324, the builder module 326, the view displayer module 328, the view updater module 330, the fetcher module 332, and the prefetcher module 334, may be partially, or entirely, implemented in hardware and/or in the processor 302. For example, the functionality may be implemented with an application specific integrated circuit, logic implemented in an embedded controller, or in logic implemented in the processor 302, among others. In some embodiments, the functionalities of the receiver module 324, the builder module 326, the view displayer module 328, the view updater module 330, the fetcher module 332, and the prefetcher module 334, can be implemented with logic, wherein the logic, as referred to herein, can include any suitable hardware (e.g., a processor, among others), software (e.g., an application, among others), firmware, or any suitable combination of hardware, software, and firmware.

Figure 4:
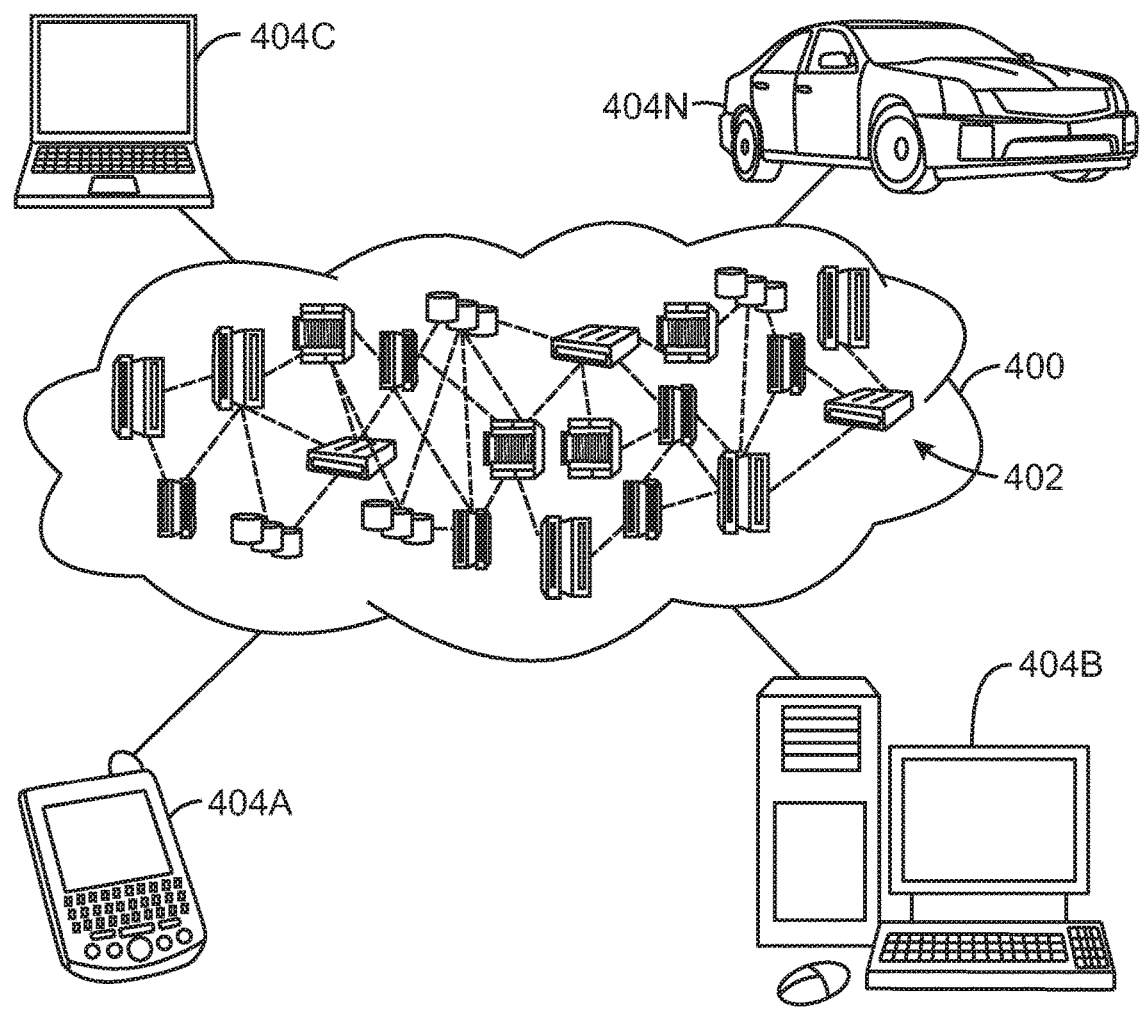
FIG. 4 is a block diagram of an example cloud computing environment according to embodiments described herein.

Referring now to FIG. 4, an illustrative cloud computing environment 400 is depicted. As shown, cloud computing environment 400 comprises one or more cloud computing nodes 402 with which local computing devices used by cloud consumers, such as, for example, personal digital assistant (PDA) or cellular telephone 404A, desktop computer 404B, laptop computer 404C, and/or automobile computer system 404N may communicate. Nodes 402 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 404A-N shown in FIG. 4 are intended to be illustrative only and that computing nodes 402 and cloud computing environment 400 can communicate with any type of computerized device over any type of network and/or network addressable connection (e.g., using a web browser).

Figure 5:
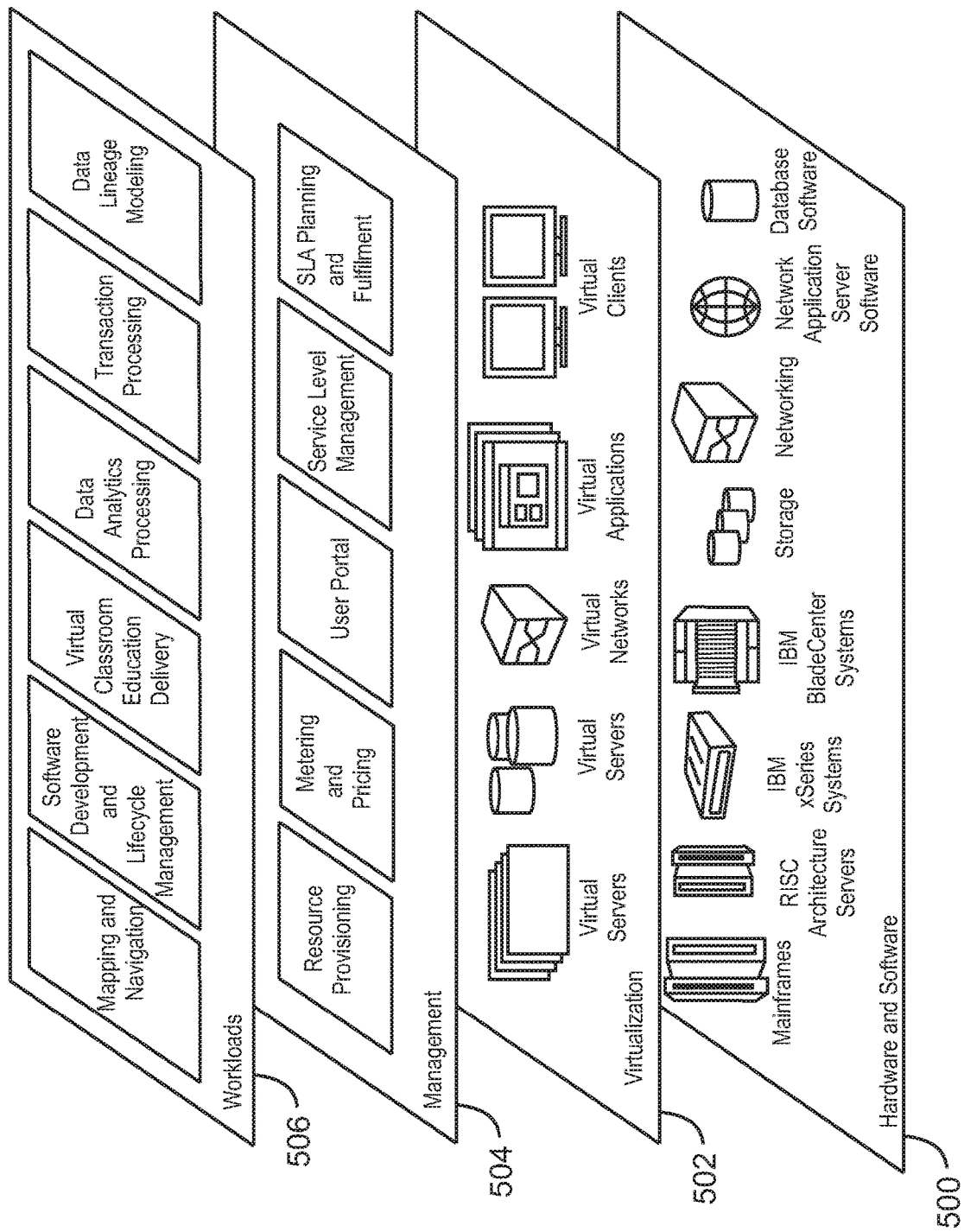
FIG. 5 is an example abstraction model layers according to embodiments described herein.

Referring now to FIG. 5, a set of functional abstraction layers provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided.

Hardware and software layer 500 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 502 provides an abstraction layer from which the following examples of virtual entities may be provided: virtual servers; virtual storage; virtual networks, including virtual private networks; virtual applications and operating systems; and virtual clients. In one example, management layer 504 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 506 provides examples of functionality for which the cloud computing environment may be utilized. Examples of workloads and functions which may be provided from this layer include: mapping and navigation; software development and lifecycle management; virtual classroom education delivery; data analytics processing; transaction processing; and data lineage modeling.

The present techniques may be a system, a method or computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present techniques may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present techniques.

Aspects of the present techniques are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 6:
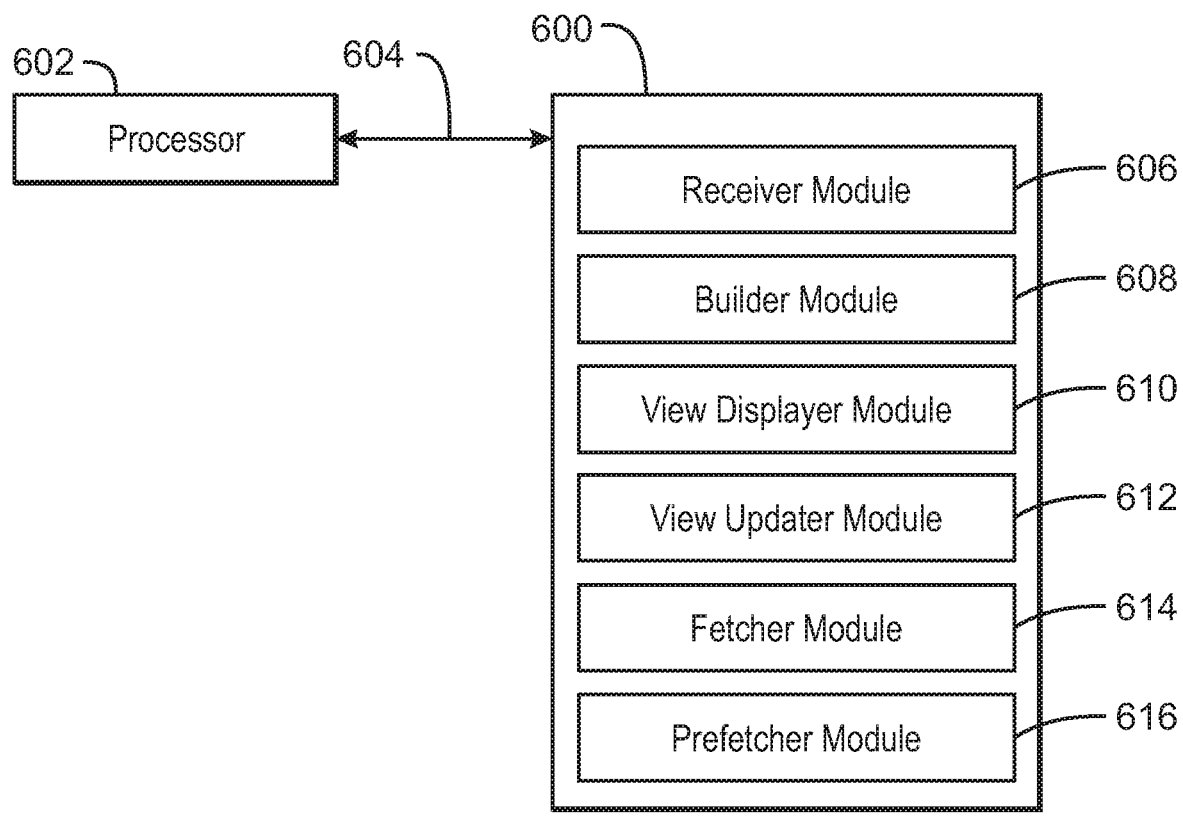
FIG. 6 is an example tangible, non-transitory computer-readable medium that can display data lineage using a three dimensional virtual reality model.

Referring now to FIG. 6, a block diagram is depicted of an example tangible, non-transitory computer-readable medium 600 that can display data lineage using a three dimensional virtual reality model. The tangible, non-transitory, computer-readable medium 600 may be accessed by a processor 602 over a computer interconnect 604. Furthermore, the tangible, non-transitory, computer-readable medium 600 may include code to direct the processor 602 to perform the operations of the method 200 of FIG. 2 above.

The various software components discussed herein may be stored on the tangible, non-transitory, computer-readable medium 600, as indicated in FIG. 6. For example, a receiver module 606 includes code to receive data lineage including a plurality of levels, and a configuration. In some examples, the data lineage may include a history of data assets. In some examples, the receiver module 606 may also include code to generate data lineage content based on the data lineage. A builder module 608 includes code to build a three dimensional (3D) virtual reality (VR) model including a first floor based on data lineage content corresponding to a first level of the plurality of levels and the configuration. For example, the configuration may include per user settings or per data lineage settings related to how data lineage content is to be presented. The builder module 608 also includes code to build a second floor in the VR model based on a second level of the plurality of levels in response to detecting a request for a change in context. A view displayer module 610 includes code to display a view of the 3D VR model. A view updater module 612 includes code to update the view of the VR model in response to detecting a request for existing data from the first level. A fetcher module 614 includes code to fetch additional data from the first level in response to detecting a request for additional data from the first level. A prefetcher module 616 includes code to prefetch data from the data lineage content based on a predicted request. In some examples, the prefetcher module 616 can include code to predict a request for data based on one or more previous requests. It is to be understood that any number of additional software components not shown in FIG. 6 may be included within the tangible, non-transitory, computer-readable medium 600, depending on the particular application.

The flowchart and block diagrams in the Figures illustrate the architecture, functionality, and operation of possible implementations of systems, methods, and computer program products according to various embodiments of the present techniques. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiment.

What is claimed is:

1. A method comprising:

receiving data lineage comprising a plurality of levels and receiving a configuration;

building, by a processor, a three dimensional (3D) virtual reality (VR) model comprising a plurality of floors based on data lineage content generated based on the data lineage and corresponding to the plurality of levels and the configuration, the 3D VR model depicting, on at least a first of the plurality of floors, a plurality of rooms of a virtual building representing data elements and hallways of the virtual building representing data flows between the data elements;

displaying, on a display device, a view of the 3D VR model, wherein the 3D VR model is configured for a user to navigate the plurality of the rooms and hallways of the virtual building to determine lineage of data;

responsive to the user turning in a first direction on the first of the plurality of floors, presenting to the user a first history of the data lineage content; and responsive to the user turning in a second direction on the first of the plurality of floors, presenting to the user a second history of the data lineage content.

2. The method of claim 1, further comprising:

responsive to detecting a request for existing data from a data asset by detecting the user navigating the 3D VR model, updating the view of the 3D VR model in by opening a door to a room in the virtual building in which the data asset is located in the 3D VR model.

3. The method of claim 2, wherein the door to the room in the virtual building in which the data asset is located is connected to a hallway of the virtual building through which the user navigates in the 3D VR model.

4. The method of claim 1, further comprising prefetching data from the data lineage content based on a predicted request.

5. The method of claim 1, further comprising predicting a request for data based on one or more previous requests.

6. A system, comprising:

a processor programmed to initiate executable operations comprising:

receiving data lineage comprising a plurality of levels and receiving a configuration;

building a three dimensional (3D) virtual reality (VR) model comprising a plurality of floors based on data lineage content generated based on the data lineage and corresponding to the plurality of levels and the configuration, the 3D VR model depicting, on at least a first of the plurality of floors, a plurality of rooms of a virtual building representing data elements and hallways of the virtual building representing data flows between the data elements;

displaying, on a display device, a view of the 3D VR model, wherein the 3D VR model is configured for a user to navigate the plurality of the rooms and hallways of the virtual building to determine lineage of data;

responsive to the user turning in a first direction on the first of the plurality of floors, presenting to the user a first history of the data lineage content; and responsive to the user turning in a second direction on the first of the plurality of floors, presenting to the user a second history of the data lineage content.

7. The system of claim 6, the executable operations further comprising:

responsive to detecting a request for existing data from a data asset by detecting the user navigating the 3D VR model, updating the view of the 3D VR model in by opening a door to a room in the virtual building in which the data asset is located in the 3D VR model.

8. The system of claim 7, wherein the door to the room in the virtual building in which the data asset is located is connected to a hallway of the virtual building through which the user navigates in the 3D VR model.

9. The system of claim 6, the executable operations further comprising prefetching data from the data lineage content based on a predicted request.

10. The system of claim 6, the executable operations further comprising predicting a request for data based on one or more previous requests.

11. A computer program product, comprising:

a computer readable storage medium having program code stored thereon, wherein the computer readable storage medium is not a transitory signal per se, the program code executable by a data processing system to initiate operations including:

receiving data lineage comprising a plurality of levels and receiving a configuration;

building a three dimensional (3D) virtual reality (VR) model comprising a plurality of floors based on data lineage content generated based on the data lineage and corresponding to the plurality of levels and the configuration, the 3D VR model depicting, on at least a first of the plurality of floors, a plurality of rooms of a virtual building representing data elements and hallways of the virtual building representing data flows between the data elements;

displaying, on a display device, a view of the 3D VR model, wherein the 3D VR model is configured for a user to navigate the plurality of the rooms and hallways of the virtual building to determine lineage of data;

responsive to the user turning in a first direction on the first of the plurality of floors, presenting to the user a first history of the data lineage content; and responsive to the user turning in a second direction on the first of the plurality of floors, presenting to the user a second history of the data lineage content.

12. The computer program product of claim 11, the operations further comprising:

responsive to detecting a request for existing data from a data asset by detecting the user navigating the 3D VR model, updating the view of the 3D VR model in by opening a door to a room in the virtual building in which the data asset is located in the 3D VR model.

13. The computer program product of claim 12, wherein the door to the room in the virtual building in which the data asset is located is connected to a hallway of the virtual building through which the user navigates in the 3D VR model.

14. The computer program product of claim 11, the operations further comprising prefetching data from the data lineage content based on a predicted request.

15. The computer program product of claim 11, the operations further comprising predicting a request for data based on one or more previous requests.

* * * * *